J. B. HUTCHINSON.
COVERS FOR TUMBLING RODS.

No. 169,706.  Patented Nov. 9, 1875.

WITNESSES
Robert Everett
B. Hebert Morse

INVENTOR
J. B. Hutchinson
Shipman &c Co
ATTORNEYS

UNITED STATES PATENT OFFICE.

JEHIAL B. HUTCHINSON, OF SPRING VALLEY, MINNESOTA.

IMPROVEMENT IN COVERS FOR TUMBLING-RODS.

Specification forming part of Letters Patent No. 169,706, dated November 9, 1875; application filed October 16, 1875.

*To all whom it may concern:*

Be it known that I, JEHIAL B. HUTCHINSON, of Spring Valley, in the county of Fillmore and State of Minnesota, have invented a new and valuable Improvement in Tumbling-Rod Covers; and I do hereby declare that the following is a full, clear, and exact description of the construction and operation of the same, reference being had to the annexed drawings, making a part of this specification, and to the letters and figures of reference marked thereon.

Figure 1:
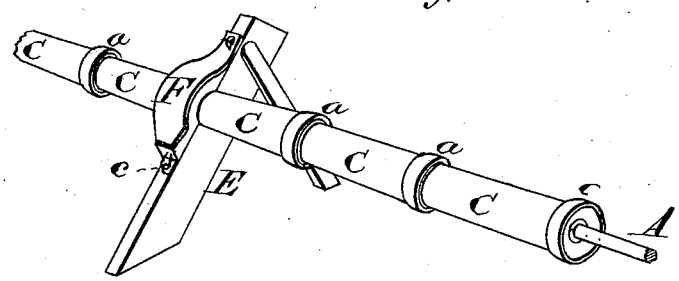
Figure 2:
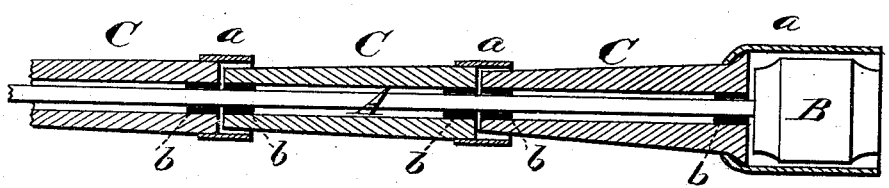

Figure 1 of the drawings is a representation of a perspective view of my tumbling-rod cover, and Fig. 2 is a longitudinal sectional view thereof.

This invention has relation to means for transmitting motion from horse-powers to thrashing-machines and other machinery; and the nature of my invention consists in inclosing the tumbling-shaft in tubular sections, having guard-rings applied at the joints of the sections, as will be hereinafter more fully explained. The invention also consists in packing the tumbling-shaft in the tubular sections by means of india-rubber, which will cause the sectional covering to turn with said shaft when unresisted, and which will allow the shaft to turn independently of any one of the sections which may happen to meet with resistance. My object is to prevent injury to persons by having their clothing wound upon the tumbling-shafts of horse-powers.

In the annexed drawing, A designates one section of a tumbling-shaft, on one end of which is applied an enlargement, B, representing part of a universal coupling for another section of shaft. There may be any number of shaft-sections, all of which will be united by gimbal joints, or other suitable universal couplings. C C designate covering sections, of any suitable length, which are made tapering, and which are bored out, as shown in Fig. 2, the bore being larger in diameter than the shaft A. On the largest end of each covering section a metal band, $a$, is secured, which overlaps the joint at the ends of two sections, and serves as a guard to prevent anything from being wound around shaft A at said joint. A similar guard will be applied over each coupling B. At the end of each covering section C I apply a packing, $b$, which is preferably made of india-rubber. The main object of such packings is to cause the covering sections C to turn with their respective shaft-sections A, and to allow these shaft-sections to turn independently of their covering sections should the latter be resisted from any cause. E designates a support for the tumbling-shaft, and F is a guard for this shaft where it has its bearings on said support. This guard F is hinged at $c$, for the purpose of allowing the shaft to be readily removed from its support, and to afford convenient access to the journal for lubricating it.

What I claim as new, and desire to secure by Letters Patent, is—

1. Tapering covering sections C and joint-guards $a$, combined with a shaft, A, substantially in the manner and for the purpose described.

2. The packing $b$, combined with the covering sections C and tumbling-shaft A, substantially as and for the purpose described.

In testimony that I claim the above I have hereunto subscribed my name in the presence of two witnesses.

JEHIAL B. HUTCHINSON.

Witnesses:
 J. Q. FARMER,
 J. D. FARMER.